US009404036B2

(12) United States Patent
Bourret-Courchesne et al.

(10) Patent No.: US 9,404,036 B2
(45) Date of Patent: Aug. 2, 2016

(54) ALKALI METAL AND ALKALI EARTH METAL GADOLINIUM HALIDE SCINTILLATORS

(75) Inventors: Edith Bourret-Courchesne, Berkeley, CA (US); Stephen E. Derenzo, Pinole, CA (US); Shameka Parms, Winston-Salem, NC (US); Yetta D. Porter-Chapman, Pleasant Hill, CA (US); Latoria K. Wiggins, Chestertown, MD (US)

(73) Assignee: The Regents of the University of California, Oakland, CA (US)

( * ) Notice: Subject to any disclaimer, the term of this patent is extended or adjusted under 35 U.S.C. 154(b) by 1199 days.

(21) Appl. No.: 12/262,132

(22) Filed: Oct. 30, 2008

(65) Prior Publication Data

US 2009/0166585 A1 Jul. 2, 2009

Related U.S. Application Data

(60) Provisional application No. 60/983,847, filed on Oct. 30, 2007, provisional application No. 61/058,534, filed on Jun. 3, 2008.

(51) Int. Cl.
*C09K 11/77* (2006.01)
(52) U.S. Cl.
CPC .................................. *C09K 11/7773* (2013.01)
(58) Field of Classification Search
CPC .......................... C09K 11/772; C09K 11/7773

USPC ................................................... 252/301.4 H
See application file for complete search history.

(56) References Cited

U.S. PATENT DOCUMENTS

| 4,835,398 | A  | * | 5/1989  | Nakamura      | 252/301.4 H |
|-----------|----|---|---------|---------------|-------------|
| 4,931,652 | A  | * | 6/1990  | Nakamura      | 252/301.4 H |
| 5,422,220 | A  | * | 6/1995  | Leblans et al.| 252/301.4 R |
| 5,439,616 | A  | * | 8/1995  | Ishiwata et al.| 252/301.4 H|
| 5,543,080 | A  | * | 8/1996  | Iwase et al.  | 252/301.4 H |
| 5,569,926 | A  | * | 10/1996 | Leblans et al.| 252/301.4 H |
| 6,228,286 | B1 | * | 5/2001  | Leblans et al.| 252/301.4 H |
| 6,387,297 | B1 | * | 5/2002  | Isoda         | 252/301.4 H |
| 6,437,336 | B1 | * | 8/2002  | Pauwels et al.| 250/361 R   |
| 2006/0104880 | A1 | * | 5/2006 | Iltis         | 252/301.4 H |
| 2007/0001118 | A1 | * | 1/2007 | Srivastava et al. | 252/301.4 H |

OTHER PUBLICATIONS

Choi et al., Binary organic single crystals for nonlinear optical application, J. Korean Physical Society, 32, S433-S435, 1998.

(Continued)

*Primary Examiner* — Matthew E Hoban
(74) *Attorney, Agent, or Firm* — Robin C. Chiang; Lawrence Berkeley National Laboratory

(57) ABSTRACT

The present invention provides for a composition comprising an inorganic scintillator comprising a gadolinium halide, optionally cerium-doped, having the formula $A_n GdX_m$:Ce; wherein A is nothing, an alkali metal, such as Li or Na, or an alkali earth metal, such as Ba; X is F, Br, Cl, or I; n is an integer from 1 to 2; m is an integer from 4 to 7; and the molar percent of cerium is 0% to 100%. The gadolinium halides or alkali earth metal gadolinium halides are scintillators and produce a bright luminescence upon irradiation by a suitable radiation.

9 Claims, 8 Drawing Sheets

(56) References Cited

OTHER PUBLICATIONS

Aggarwal et al., Modified Bridgman growth of a novel NLO organic crystal (2-methyoxyphenyl)-methylene-propanedinitrile, J. of Crystal Growth, 166, 542-544, 1996.

Choi et al., A simple inexpensive Bridgman-Stockbarger crystal growth system for organic Crystal Growth of organic materials, American Chemical Society, ACS Conference Proceedings, 264-266, 1996.

Aggarwal et al., A novel Bridgman-Stockbarger melt growth system for organic nonlinear optical materials, Meas. Sci. Technol., 4, 793-795, 1993.

Darwish et al., Photoinduced charge in BsO:Cr3+ homegrown single crystal at room temperature during grating formation under Ar+ laser illumination in EPR experiment, SPIE—The International Society for Optical Engineering, 2849, 67-78, 1997.

Aggarwal et al., Morphology and formation of the color core of Bi12SiO20 crystals grown by the Czochralski method, J. of Crystal Growth, 137, 132-135, 1994.

Triboulet, The Travelling Heater Method (THM) for Hg1-xCdxTe and related materials. Prog. Cryst. Gr. Char. Mater., 28, 85-144, 1994.

Funaki et al., Growth and characterization of CdTe single crystals for radiation detectors, Nucl. Instr. And Methods, 436, 120-126, 1999.

* cited by examiner

ALKALI METAL AND ALKALI EARTH METAL GADOLINIUM HALIDE SCINTILLATORS

CROSS-REFERENCE TO RELATED APPLICATIONS

This application claims priority to U.S. Provisional Patent Applications 60/983,847 and 61/058,534, filed Oct. 30, 2007 and Jun. 3, 2008, respectively, which are hereby incorporated by reference in their entirety.

STATEMENT OF GOVERNMENTAL SUPPORT

The invention described and claimed herein was made utilizing funds supplied by the U.S. Department of Homeland Security under Grant No. HSHQDC-07-X-00170 and the U.S. Department of Energy under Contract No. DE-AC02-05CH11231. The government has certain rights in this invention.

FIELD OF THE INVENTION

The present invention is in the field of inorganic crystals with scintillation properties.

BACKGROUND OF THE INVENTION

The need for radiation detecting materials has been at the forefront of materials research in recent years due to applications in national security, medical imaging, X-ray detection, oil well logging, and high-energy physics. There has been a growing interest in the development of scintillator materials with (1) good stopping power for gamma rays, (2) high light output, (3) proportional response, and (4) large, transparent, low cost crystals. For gamma-ray detection, several known inorganic scintillators, such as bismuth germanium oxide (BGO) and lutetium oxyorthosilicate (LSO), are currently being utilized in various radiation detection devices. Although these scintillators have good luminosity, their scintillation properties (decay times, linearity, etc.) are lacking in one or more areas. Other known scintillators, such as NaI:Ti, $BaF_2$, and $LaBr_3$:Ce, also fall short in one or more of these properties. Within the last decade, researchers have reported significant scintillation in the cerium-doped binary lanthanide halides. Additionally, $Ce^{3+}$-doped ternary lanthanide halides, particularly those containing alkali metals, exhibit high luminosities (>20,000 ph/MeV) and fast decay times (<1 µs).

SUMMARY OF THE INVENTION

The present invention provides for a composition comprising an inorganic scintillator comprising a gadolinium halide, optionally cerium-doped, having the formula $A_nGdX_m$:Ce; wherein A is nothing, an alkali metal, such as Li or Na, or an alkali earth metal, such as Ba; X is F, Br, Cl, or I; n is an integer from 1 to 2; m is an integer from 4 to 7; and the molar percent of cerium is 0% to 100%. The gadolinium halides or alkali earth metal gadolinium halides are scintillators and produce a bright luminescence upon irradiation by a suitable radiation.

The present invention provides for an inorganic scintillator described and/or having properties shown in Tables 1, 2 and/or 3.

The present invention also provides for a composition comprising essentially of a mixture of halide salts useful for producing the inorganic scintillator. The mixture comprises essentially of a solid alkali metal halide or solid alkali earth metal halide, and solid gadolinium halide, and optionally solid cerium halide. In some embodiments, (a) the mixture has a stoichiometry of about 1 to 2 alkali metal or alkali earth metal atoms: about 1 gadolinium atom: about 4 to 7 halogen atoms, (b) the halogen is F, Br, Cl, or I, and (c) the molar percent of cerium is from 0% to 100%. The solid alkali metal halide, alkali earth metal halide, solid gadolinium halide, and solid cerium halide can be AX, $AX_2$, $GdX_3$, and $CeX_3$, respectively. The crystals or salts can be powdered crystals.

The present invention further provides for a method for producing the composition comprising an inorganic scintillator comprising: (a) providing a mixture of halide salts useful for producing the inorganic scintillator as described above, (b) heating the mixture so that the halide salts or solids start to react, and (c) cooling the mixture of the formed composition to room temperature such that the composition is formed.

The present invention further provides for a method for producing the composition comprising an inorganic scintillator comprising: (a) providing a mixture comprising essentially of solid alkali earth metal halide and solid gadolinium halide, and optionally solid cerium halide, wherein (i) the mixture has a stoichiometry of about 1 to 2 alkali metal or alkali earth metal atoms: about 1 gadolinium atom: about 4 to 7 halogen atoms, (ii) the halogen is F, Br, Cl, or I, and (iii) the molar percent of cerium is from 0% to 100%, (b) heating the mixture so that the halide salts or solids start to react, and (c) cooling the mixture of the formed composition to room temperature such that the composition is formed.

The invention also provides for a device comprising the composition comprising the inorganic scintillator, wherein the composition is a component of a scintillating detector for industrial, medical, protective and defensive purpose or in the oil and nuclear industry.

BRIEF DESCRIPTION OF THE DRAWINGS

The foregoing aspects and others will be readily appreciated by the skilled artisan from the following description of illustrative embodiments when read in conjunction with the accompanying drawings.

DETAILED DESCRIPTION OF THE INVENTION

The Inorganic Scintillators

Figure 1:
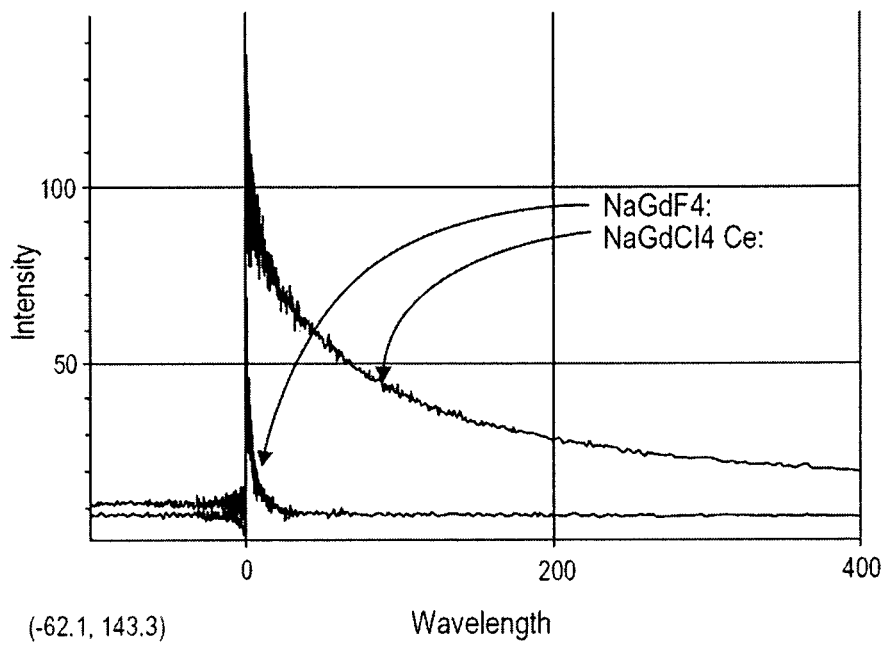
FIG. 1 shows the pulsed X-ray luminescence spectra showing the decay of $NaGdF_4$ and $NaGdCl_4$ doped with 3% Ce (panel A), and $LiGdCl_4$ (panel B).
Figure 1:
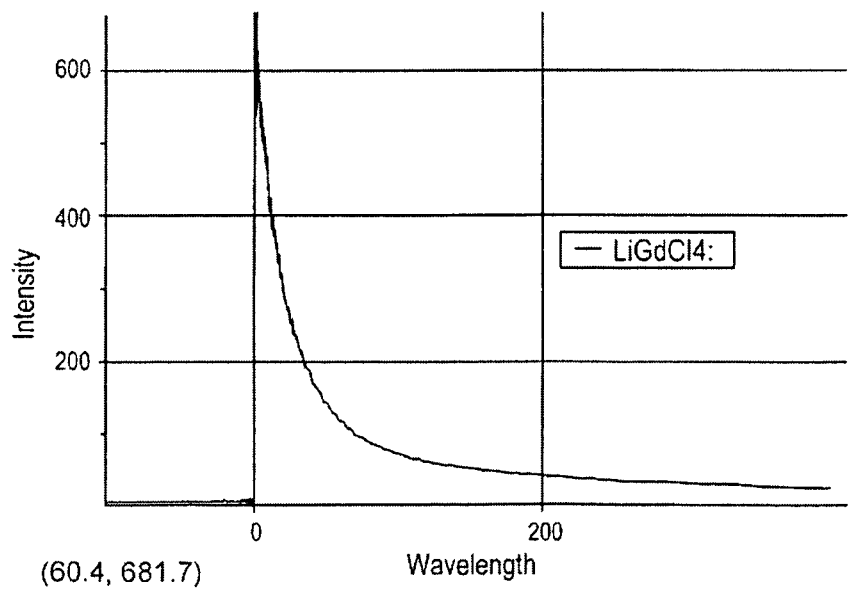

The inorganic scintillator can be in a microcrystalline or crystal form. The crystal can be any size ranging from at least 10 nm, 20 nm, 100 nm, 1 µm, 10 µm, 100 µm, or 1 mm. The crystals can also have a size ranging up to 100 nm, 1 µm, 10 µm, 100 µm, 1 mm, or 10 mm.

The cerium atoms in the inorganic scintillator substitute for the gadolinium atoms. The molar percent of cerium is defined as the percent of the number of cerium atoms in the total number of cerium and gadolinium atoms in the inorganic scintillator. The phrase "the molar percent of cerium is from P % to Q %" means "the molar percent of cerium" is from "P % to Q %", inclusive of both P % and Q %.

The molar percent of cerium is from 0% to 100%, or from more than 0% to 100%. The range of the molar percent of cerium in the organic scintillator can be from more than 0%, 0.1%, 0.5%, or 1% to 2%, 3%, 5%, 10%, 20%, 30%, 50%, 70%, or 90%. In some embodiments, the molar percent of cerium is from 0% to 50%. In some embodiments, the molar percent of cerium is from 0% to 10%. In some embodiments, the molar percent of cerium is from 0% to 5%. In some embodiments, the molar percent of cerium is from 1% to 5%. In some embodiments, the molar percent of cerium is from 1% to 10%.

In some embodiments of the invention, the molar percent of cerium is from more than 0% to 50%. In some embodiments, the molar percent of cerium is from 10% to 30%, or from 15% to 25%.

The inorganic scintillators of the present invention are useful as they are scintillators and they produce a useful bright and fast scintillation in response to irradiation by visible and invisible light, such as x-ray or gamma rays. The crystals of the inorganic scintillator also have the added advantage of having the property of readily growing into crystals. Large size crystals can be grown by the following technique: Bridgman growth and related techniques, Czochralski growth and related techniques, the traveling heater method and related techniques.

In some embodiments of the present invention, the inorganic scintillator has a decay time, upon excitation by X-ray, that is equal to or less than 50 ns, 35 ns, 25 ns, or 22 ns.

The inorganic scintillator is any compound of Table 1 in microcrystalline or crystal form.

In some embodiments of the invention, the inorganic scintillator comprises a cerium-doped gadolinium halide having the formula GdX$_3$:Ce; wherein X is F, Br, Cl, or I; and the molar percent of cerium is from more than 0% to 100%.

In some embodiments of the invention, the inorganic scintillator comprises a gadolinium halide having the formula AGdX$_4$:Ce; wherein A is Li or Na; X is F, Br, Cl, or I; and the molar percent of cerium is 0% or from more than 0% to 100%.

In some embodiments of the invention, the inorganic scintillator comprises a gadolinium halide having the formula Ba$_n$GdX$_m$:Ce; wherein X is F, Br, Cl, or I; when n is 1 then m is 5, and when n is 2 then m is 7; and the molar percent of cerium is 0% or more than 0% to 100%.

Characterization of the Inorganic Scintillators

The crystals of the invention can be characterized using a variety of methods. The crystals can be characterized regarding X-ray diffractometry, X-ray luminescence spectra, and/or pulsed X-ray time response. X-ray diffractometry determines the composition of crystalline solids, such as crystalline phase identification. X-ray luminescence spectra determines the spectra components. Pulsed X-ray time response determines luminosity, decay times, and fractions. X-ray luminescence is used to determine the relative luminosity of a crystal. An X-ray excited emission spectra is obtained of a crystal by irradiating the crystal with an X-ray and collecting the emission light at 90° by a CCD detector.

In some embodiments of the invention, the luminosity of the inorganic scintillator is more than the luminosity of YAP and/or BGO. In further embodiments of the invention, the luminosity of the inorganic scintillators is more than double the luminosity of YAP and/or BGO. In still further embodiments of the invention, the luminosity of the inorganic scintillators is more than double the luminosity of YAP and more than quadruple the luminosity of BGO.

In some embodiments, the inorganic scintillators of the invention have a ph/MeV that is at least 30,000, or at least 60,000; and a decay of at 37% in 33 ns or at least 9% in 26 ns.

Preparation of the Inorganic Scintillators

The inorganic scintillators of the invention can be prepared using a variety of methods. For example, the crystals useful for fabrication of luminescent screens can be prepared by a solid-state reaction aided, or optionally not aided, by a flux of halides as described herein. In some embodiments, the crystals are prepared by providing a composition comprising essentially of a mixture of halide salts useful for producing the inorganic scintillator. The mixture is heated to a temperature of up to about 900° C. using a simple programmable furnace to produce a reactive mixture. The reaction is maintained at temperature for the mixture to fully react and produce the desired compound. The resultant product of reaction is then cooled slowly at about 2 to 5° C./minute. The heating, equilibration and cooling steps may be repeated for a number of times to assure complete reactions of the starting reactants. Complete mixing of the reactants can be achieved by grinding the mixture between each reactive cycle.

A particular method of preparing the inorganic scintillator of the invention is as follows: Bridgman growth and related techniques, Czochralski growth and related techniques, the traveling heater method and related techniques. These methods can be used to produce the inorganic scintillator as single crystals on a one-by-one basis.

The Bridgman growth technique is a directional solidification process. The technique involves using an ampoule containing a melt which moves through an axial temperature gradient in a furnace. Single crystals can be grown using either seeded or unseeded ampoules. The Bridgman growth technique is described in "binary organic single crystals for nonlinear optical application", J. Korean Physical Society, 32 pp S433-S435, 1998, "Modified Bridgman growth of a novel NLO organic crystal (2-methyoxyphenyl)-methylene-propanedinitrile", J. of Crystal Growth, 166, pp 542-544, 1996; "A simple inexpensive Bridgman-Stockbarger crystal growth system for organic Crystal Growth of organic materials" (ACS conference proceedings series) American Chemical Society, pp 264-266, 1996; and "A novel Bridgman-Stockbarger melt growth system for organic nonlinear optical materials", *Meas. Sci. Technol.,* 4, pp 793-795, 1993; which are incorporated in their entireties by reference.

The Czochralski growth technique comprises a process of obtaining single-crystals in which a single crystal material is pulled out of the melt in which a single-crystal seed is immersed and then slowly withdrawn; desired conductivity type and doping level is accomplished by adding dopants to the melt. The Czochralski growth technique is described in "Czochralski crystal-growth system with Diameter Control", *NASA Tech Briefs,* 21, p 10a, 1997; "Photoinduced charge in BSO:$Cr^{3+}$ homegrown single crystal at room temperature during grating formation under $Ar^+$ laser illumination in EPR experiment", *SPIE—The International Society for Optical Engineering,* 2849, pp 67-78, 1997, "A Versatile Czochralski crystal growth system with polishing of Bismuth Silicate and Bismuth Germanate", *Optics & Photonics News,* 5(2), pp S1-S2, 1994; "Morphology and formation of the color core of $Bi_{12}SiO_{20}$ crystals grown by the Czochralski method", *J. of Crystal Growth,* 137, pp 132-135, 1994; and "Observations on the polishing of Bismuth Silicon Oxide crystals", *J. of Optics* 23(4), pp 179-185, 1994; which are incorporated in their entireties by reference.

The traveling heater method is described in Triboulet, *Prog. Cryst. Gr. Char. Mater.,* 128, 85 "(1994) and Funaki et al., *Nucl. Instr. And Methods,* A 436 (1999), which are incorporated in their entireties by reference.

A particular method of preparing inorganic scintillators of the invention is the ceramic method which comprises the following steps: two or more powder reactants are ground together, such as with a mortar and pestle, for a sufficient period, such as about 10 minutes, to produce a reactant mixture. The reactant mixture is placed in a container, such as a glove box, filled with one or more inert gas, such as nitrogen gas. The container is under a very dry condition. The dry condition is required due to the hygroscopic nature of the halides within the reactant mixture. The reactant mixture is sealed into evacuated quartz ampoules and then heated to a temperature of over 400° C., such as with a Lindberg/Blue M Mini-Mite™ furnace (Thermo Fisher Scientific Inc., Waltham, Mass.). When cerium halide is added to the powder reactants for grinding, methanol can be further added, and grinding can take place until the mixture appears dry.

The above processes can also be applied using alkali metal or alkali earth metal halides, gadolinium halides, and cerium halides to produce the inorganic scintillators of the present invention.

The resulting crystals are then characterized by the methods described herein. The resulting crystals also have properties similar to those described herein.

Application of the Inorganic Scintillators

The inorganic scintillators of this invention have many advantages over other known crystals. The inorganic scintillators and produce a luminescence in response irradiation that is brighter and faster than known and commercially used scintillators. The scintillating crystals have a number of applications as detectors, such as in the detection of gamma-ray or neutrons, which has use in national security and medical imaging applications.

The invention is useful for the detection of ionizing radiation. Applications include medical imaging, nuclear physics, nondestructive evaluation, treaty verification and safeguards, environmental monitoring, and geological exploration. In particular, the new inorganic scintillator will allow septaless time-of-flight PET to be achieved. This will be a major improvement, providing much finer resolution, higher maximum event rates, and clearer images.

The invention also relates to the use of the scintillating material above as a component of a detector for detecting radiation in particular by gamma rays and/or X-rays and/or neutrons. Such a detector especially comprises a photodetector optically coupled to the scintillator in order to produce an electrical signal in response to the emission of a light pulse produced by the scintillator. The photodetector of the detector may in particular be a photomultiplier, photodiode, or CCD sensor.

The inorganic scintillators of this invention have use as neutron detecting scintillators in that: $^6$Li (n, α) reaction provides good detection of low energy neutrons, and $^{157}$Gd provides a high cross section for thermal neutron adsorption. Also, LiI (Eu) has shown to have 11,000 ph/MeV, τ is 1,400 ns.

A particular use of this type of detector relates to the measurement of gamma or x-ray radiation, such a system is also capable of detecting alpha and beta radiation and electrons. The invention also relates to the use of the above detector in nuclear medicine apparatuses, especially gamma cameras of the Anger type and positron emission tomography scanners (see, for example C. W. E. Van Eijk, "Inorganic Scintillator for Medical Imaging", International Seminar New types of Detectors, 15 19 May 1995—Archamp, France. Published in "Physica Medica", Vol. XII, supplement 1, June 96; hereby incorporated by reference).

In another particular use, the invention relates to the use of the above detector in detection apparatuses for oil drilling, (see, for example "Applications of scintillation counting and analysis", in "Photomultiplier tube, principle and application", chapter 7, Philips; hereby incorporated by reference).

It is to be understood that, while the invention has been described in conjunction with the preferred specific embodiments thereof, the foregoing description is intended to illustrate and not limit the scope of the invention. Other aspects, advantages, and modifications within the scope of the invention will be apparent to those skilled in the art to which the invention pertains.

All patents, patent applications, and publications mentioned herein are hereby incorporated by reference in their entireties.

The invention having been described, the following examples are offered to illustrate the subject invention by way of illustration, not by way of limitation.

EXAMPLE 1

Synthesis and Characterization of the Inorganic Scintillators

The following inorganic scintillators are synthesized and the following characteristics are obtained using procedures well known to one skilled in the art. Table 1 lists the samples tested and their corresponding characteristics.

TABLE 1

Properties of crystals

| Sample | Dopant % | XRD results | Emission wavelength (nm) | Relative luminosity (×YAP) | Relative luminosity (×BGO) | Percentage of Decay in 50 ns |
|---|---|---|---|---|---|---|
| $GdF_3$ | 3% $Ce^{3+}$ | Good | 360 | 0.45 | 0.69 | 3% |
| $LiGdF_4$ | 3% $Ce^{3+}$ | Good | 315, 600 | 0.04 | 0.06 | 5% |
| $NaGdF_4$ | 0% $Ce^{3+}$ | Good | 422 | 0.37 | 0.58 | 4% |
| $NaGdF_4$ | 3% $Ce^{3+}$ | Good | 410 | 0.08 | 0.13 | 13% |
| $GdCl_3$ | 3% $Ce^{3+}$ | Good | 345 | 1.15 | 1.77 | 41% |
| $BaGdCl_5$ | 3% $Ce^{3+}$ | I | 371, 393 | 2.78 | 4.26 | 24% |
| $Ba_2GdCl_7$ | 1.5% $Ce^{3+}$ | Good | 310, 361, 386 | 0.64 | 1.0 | 6% |
| $GdBr_3$ | 3% $Ce^{3+}$ | Good | 420 | 0.49 | 0.75 | 46% |
| $LiGdBr_4$ | 3% $Ce^{3+}$ | I | N/A | 0.33 | 0.50 | 51% |
| $NaGdBr_4$ | 3% $Ce^{3+}$ | I | 390, 415 | 0.49 | 0.78 | 16% |
| $BaGdBr_5$ | 3% $Ce^{3+}$ | I | 360, 400, 440 | 0.77 | 1.18 | 4% |
| $GdI_3$ | 3% $Ce^{3+}$ | Good | 573 | 0.22 | 0.34 | 6% |
| $LiGdI_4$ | 3% $Ce^{3+}$ | I | 570 | 0.12 | 0.19 | 55% |
| $NaGdI_4$ | 3% $Ce^{3+}$ | I | 600 | 0.08 | 0.12 | 29% |
| $BaGdI_5$ | 3% $Ce^{3+}$ | I | 420, 510 | 2.67 | 4.23 | 26% |

Figure 2:
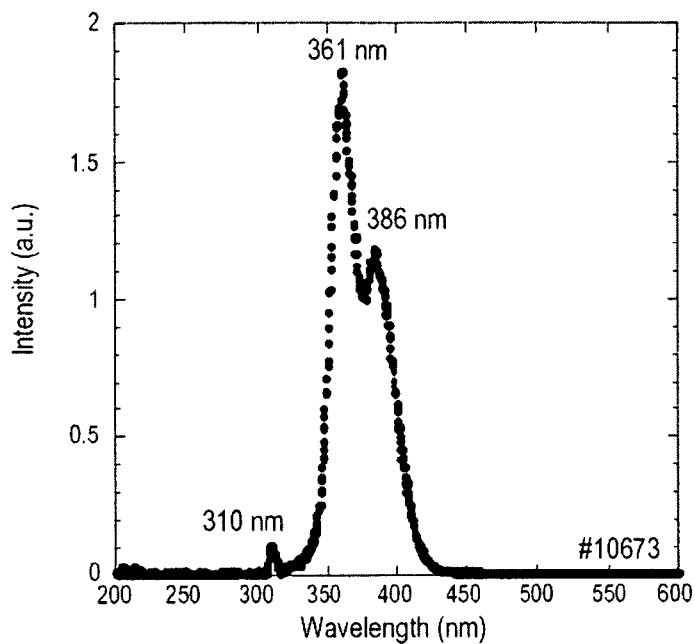
FIG. 2 shows the X-ray excited luminescence of $Ba_2GdCl_7$ (panel A) and the pulsed X-ray decay curve of $Ba_2GdCl_7$ (panel B). The decay time of $BaGdCl_5$ is about 26 ns.
Figure 2:
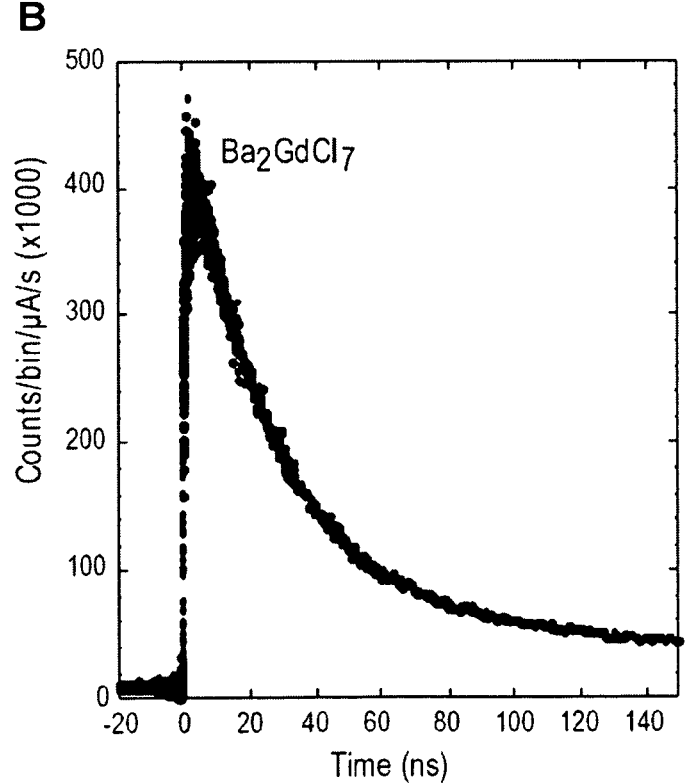

The data depicting the decay time of several inorganic scintillators are shown in FIG. 1. The X-ray excited luminescence of $Ba_2GdCl_7$ and pulsed X-ray decay curve of $BaGdCl_5$ are shown in FIG. 2. The decay time of $BaGdCl_5$ is about 26 ns.

EXAMPLE 2

Cerium Optimization of $BaGdCl_5$

The following cerium-doped $BaGdCl_5$ inorganic scintillators are synthesized and the following characteristics are obtained using procedures well known to one skilled in the art. Table 2 lists the effect of the amount of cerium doping on the characteristics of the $BaGdCl_5$ inorganic scintillator. Having more than 0%, or 5% or more, of cerium increases the luminosity of $BaGdCl_5$. Having 2.00% cerium reduces the decay time significantly.

TABLE 2

Cerium optimization of $BaGdCl_5$

| % Ce | Relative luminosity to YAP | Relative luminosity to BGO | Decay Time (ns) τ1 | Decay Time (ns) τ2 | Decay Time (ns) τ3 |
|---|---|---|---|---|---|
| 0.00 | 0.71 | 1.09 | 17,000 | 28,000 | 350 |
| 0.50 | 1.39 | 2.14 | 190 | 1,206 | 800 |
| 1.00 | 1.20 | 1.90 | 1,360 | 200 | 40 |
| 2.00 | 1.42 | 2.17 | 31 | 140 | 770 |
| 5.00 | 1.77 | 2.71 | 30 | 110 | 470 |
| 10.00 | 1.61 | 2.46 | 30 | 110 | 500 |

EXAMPLE 3

Cerium Doped $LiGdCl_4$ and $NaGdCl_4$ $LiGdCl_4$ and $NaGdCl_4$ doped with high concentrations of $Ce^{3+}$ give luminosity. $LiGdCl_4$ (20% Ce) is characterized as follows: ~64,000 ph/MeV; 37% at 33 ns. $NaGdCl_4$ (20% Ce) is characterized as follows: ~33,000 ph/MeV; 9% at 26 ns. $LiGdCl_4$ and $NaGdCl_4$ exhibit efficient activation by $Ce^{3+}$ cations. Each compound is synthesized using solid-state chemistry techniques and is characterized by powder X-ray diffraction (PXRD), photoluminescence (PL), X-ray excited luminescence (XRL), and pulsed X-ray luminosity measurements (PXRL)

Experimental Method

Synthesis. $LiGdCl_4$ and $NaGdCl_4$ are synthesized using the solid-state reactions,

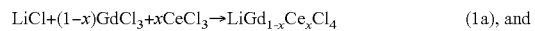

$$LiCl+(1-x)GdCl_3+xCeCl_3 \rightarrow LiGd_{1-x}Ce_xCl_4 \quad (1a), \text{ and}$$

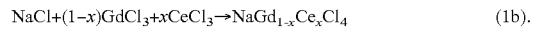

$$NaCl+(1-x)GdCl_3+xCeCl_3 \rightarrow NaGd_{1-x}Ce_xCl_4 \quad (1b).$$

Due to the hygroscopic nature of the halides, all handling is performed in an argon-filled glove box under dry conditions. The $LiGdCl_4$ samples are heated at 700° C. for 1 h, whereas those of $NaGdCl_4$ are heated to 550° C. for 10 h, all in sealed evacuated quartz tubes. Both compounds are doped with the following molar percentages of cerium trichloride: 0, 0.5, 1, 2, 5, 10, and 20 %. Colorless hygroscopic powders are obtained for each sample.

Characterization. The crystallinity and structure identification of each sample is determined by PXRD. An in-house diffraction setup comprising a Bruker Nonius FR591 rotating anode X-ray generator equipped with a copper target and a 50 kV and 60 mA electron beam is utilized. A more detailed description of this setup is supplied in S. Derenzo et al. ("Design and implementation of a facility for discovering new scintillator materials," IEEE Trans. Nucl. Sci., vol. 55, 2008, pp. 1458-1463; hereby incorporated by reference). The resultant diffraction rings are converted into a 1D standard diffraction pattern with Fit2D freeware (A. P. Hammersley, "FIT2D: an introduction and overview," ESRF Internal Report, 1997; hereby incorporated by reference). This pattern is then used to phase match with known diffraction patterns in the Powder Diffraction File (PDF-4+) database ("PDF4+ Powder Diffraction File," Newton Square, PA, USA: International Centre for Diffraction Data, 2006; hereby incorporated by reference) using the Match! Software (Crystal Impact GbR) (K. Brandenburg and H. Putz, "Match! User Manual Version 1.4," 2006; hereby incorporated by reference).

All luminescence measurements are conducted at room temperature on samples consisting of micron-size particles contained in quartz cuvettes. Photoluminescence excitation and emission spectra are measured utilizing a Horiba Fluorolog 3 fluorescence spectrometer within the spectral range of 250 nm -800 nm using spectral resolutions of 3 nm for excitation and 2 nm for emission. X-ray excited emission spectra are also measured for each sample using a second port of the Bruker Nonius x-ray generator and their spectral response is recorded by a SpectraPro-2150i spectrometer (Acton Research Corp., Acton, Mass.) coupled to a PIXIS:100B charge-coupled detector (CCD) (Princeton Instruments, Inc., Trenton, N.J.).

Scintillation decay measurements are performed on each sample and a sample of $YAlO_3$:$Ce^{3+}$ (YAP:Ce Phosphor Technology Ltd., PTL Grade—QM58/N-S1). An in-house pulsed X-ray system that produces 80 ps (fwhm) pulses of X-rays having a mean energy of 18 keV is utilized in these measurements. Fluorescent photons from each sample are detected by a microchannel phototube with 35 ps (fwhm) response (S. E. Derenzo, M. J. Weber, W. W. Moses, and C. Dujardin, "Measurements of the intrinsic rise times of common inorganic scintillators," IEEE Trans. Nucl. Sci., vol. NS-47, 2000, pp. 860-864; hereby incorporated by reference). The luminescence decay times are determined by fitting the data to a sum of exponential decay curves. In summary, the intensity is described by a sum of exponential components:

$$I(t) = f_0 + \sum_{i=1} [f_i / \tau_i] \exp[-(t - t_0) / \tau_i], \quad (2)$$

where the fractions sum to unity $$\int I(t) dt = \sum_{i=0} f_i = 1. \quad (3)$$

The constant fraction $f_0$ and the fractions $f_i$ and exponential decay times $\tau_i$ are varied to minimize chi-squared between I(t) and the data. The pulsed X-ray source, microchannel phototube, and fitting procedures are described in Derenzo, et al. (2000). The reported estimated luminosities are determined by comparison of the sample luminosities to the luminosity measured for the YAP:Ce powder standard. In addition, for normalization, an average luminosity of 18,000 ph/MeV for YAP:Ce in crystal form is used. This gives a ratio of YAP (powder) to YAP (crystal) of 1.8 for obtained measurements. This ratio is used as a convenient method to estimate the luminosities of the samples.

RESULTS $LiGdCl_4$ forms a tetragonal structure with a density=3.70 g/cm³, and $NaGdCl_4$ forms a triclinic structure with a density=3.44 g/cm³. In $LiGdCl_4$, the dopant, $Ce^{3+}$, is assumed to occupy the gadolinium sites because it has a better fit in terms of ionic radii (r(Li)=0.59 Å, r(Gd)=1.05 Å and r(Ce)=1.14 Å) (R. D. Shannon, "Revised Effective Ionic Radii and Systematic Studies of Interatomic Distances in Halides and Chalcogenides," Acta Cryst., vol. A32, 1976, pp. 751-767; hereby incorporated by reference) and charge. In the case of $NaGdCl_4$, the $Na^+$ and $Gd^{3+}$ have similar bonding (both CN=7) and ionic radii (r(Na)=1.12 Å, r(Gd)=1.00 Å compared to r(Ce)=1.07 Å) however, it is more probable that the cerium substitutes into the trivalent gadolinium site than the monovalent site of sodium. Both compounds show high scintillation light yield up to 20% cerium doping level. Doping beyond this concentration causes a breakdown of the lattice where neither compound could be formed. The crystalline structure of the $LiGdCl_4$ samples was confirmed by PXRD. Only low crystallinity was obtained for the $NaGdCl_4$ samples.

Figure 3:
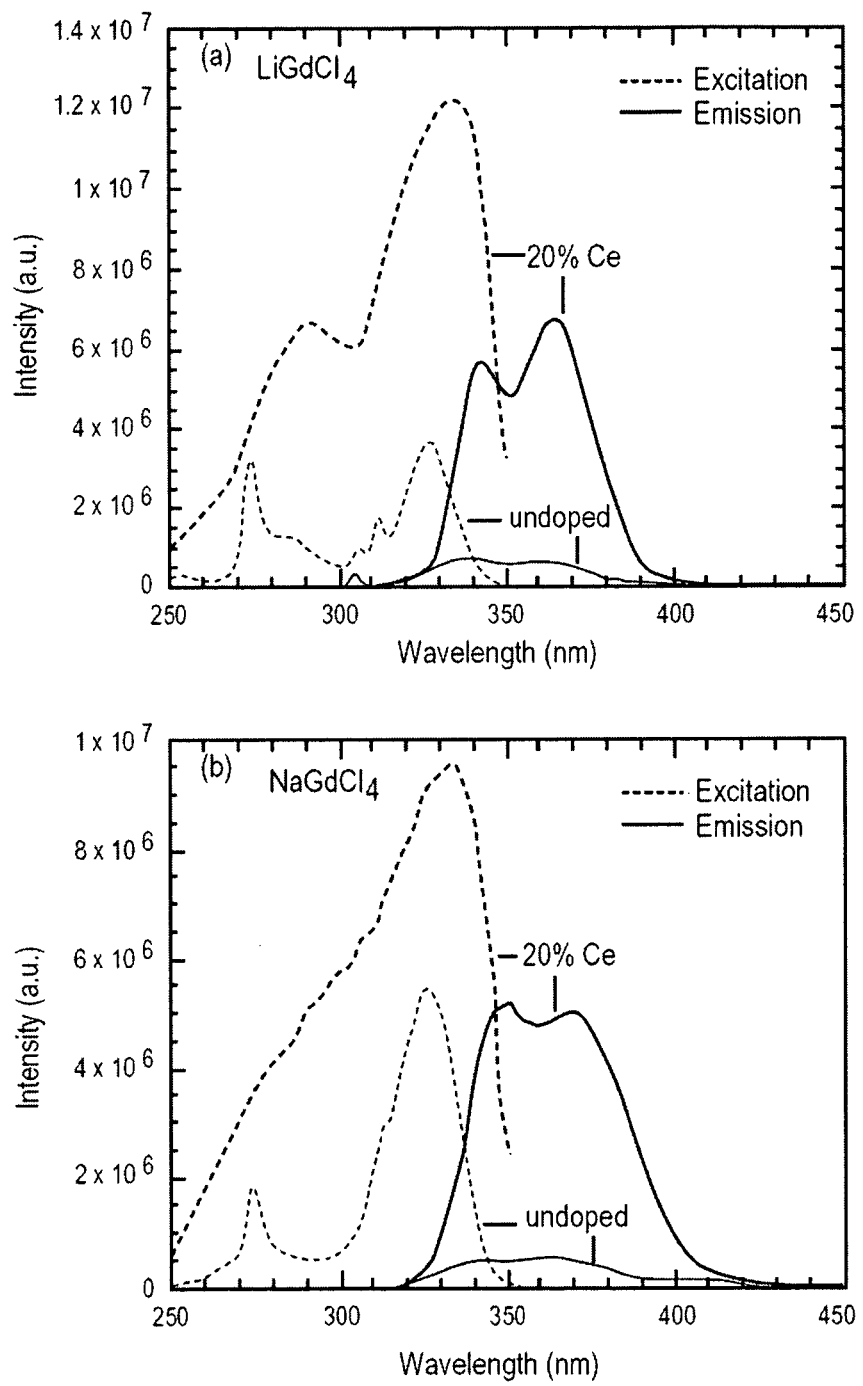
FIG. 3 shows the excitation and emission spectra of undoped and 20% $Ce^{3+}$-doped (a) $LiGdCl_4$ and (b) $NaGdCl_4$. Emission at 370 nm was used to generate the excitation spectra for all samples. An excitation wavelength of 270 nm was used to generate the emission spectra for the undoped materials. An excitation wavelength of 290 nm was used to generate the emission spectra for the doped $LiGdCl_4$, whereas an excitation wavelength of 300 nm was used for the emission spectra of doped $NaGdCl_4$. All spectra were recorded at room temperature.

Emission/Excitation Spectra. $LiGdCl_4$ and $NaGdCl_4$ excitation and emission spectra of the undoped and doped materials were obtained from room temperature photoluminescence measurements (FIGS. 3 (a) and (b)). Both doped samples exhibit a double emission band between 310 and 410 nm typical of $Ce^{3+}$ 5d-4f emission. The maxima of the doublet emission are found at approximately 345 nm and 365 nm for $LiGdCl_4$ and 350 nm and 370 nm for $NaGdCl_4$.

The excitation spectra are characteristic of the 5d excitation bands of $Ce^{3+}$ emission at room temperature with two broad bands between 250 and 350 nm. The maximum excitation is found at 335 and 330 nm for $LiGdCl_4$ and $NaGdCl_4$, respectively. There is a significant overlap of the cerium excitation bands and the high-energy cerium emission band, indicating a possible self-absorption mechanism. In the undoped materials, the doublet cerium-related emission is weak but still present, indicating that some cerium was present, most likely in the $GdCl_3$ used for the synthesis of the samples. Additional bands are observed for both undoped samples around 310 nm in emission and 275 nm in excitation. These bands correspond to the optical signature of $Gd^{3+}$ ions.

Figure 4:
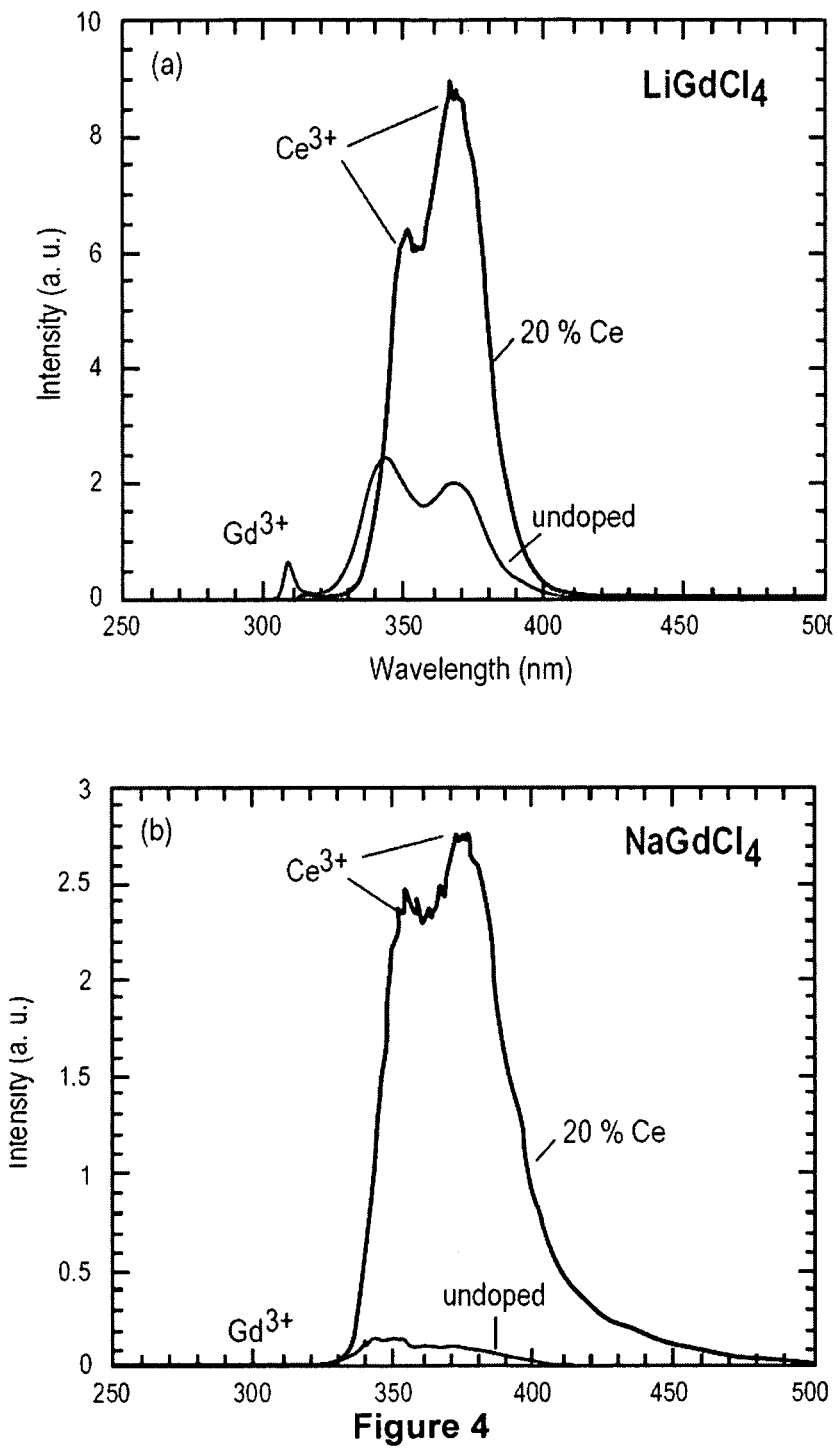
FIG. 4 shows the room temperature X-ray excited luminescence spectra of (a) $LiGdCl_4$ and (b) $NaGdCl_4$. Gadolinium emission peaks at ~310 nm are evident in the undoped samples in both materials.

FIGS. 4 (a) and (b) present the X-ray excited emission spectra at room temperature of the undoped and 20% doped $LiGdCl_4$ and $NaGdCl_4$, respectively. These spectra show similar characteristics as those found under optical excitation: $Ce^{3+}$ 5d-4f emission and residual emission from $Gd^{3+}$ ions.

In addition, the X-ray excited emission spectra highlights two new features. For the $LiGdCl_4$:Ce, the self-absorption mechanism can be observed in the reduction of the high energy part of the doublet from low to high cerium concentrations and in the relative intensity of the two peaks.

In the case of $NaGdCl_4$:Ce there is a new broad-band emission at low energy. The band centered around 425 nm overlaps with the cerium emission. Very similar features were observed for $LaCl_3$:$Ce^{3+}$ and attributed to self-trapped exciton emission (STE). In $LaCl_3$, the presence of STEs was established by X-ray excited electron-paramagnetic-resonance measurements and accredited to an out-of-plane self-trapped exciton formed by two nearest Cl neighbors [29]. Since we are investigating chloride compounds as well, a similar configuration could exist.

Figure 5:
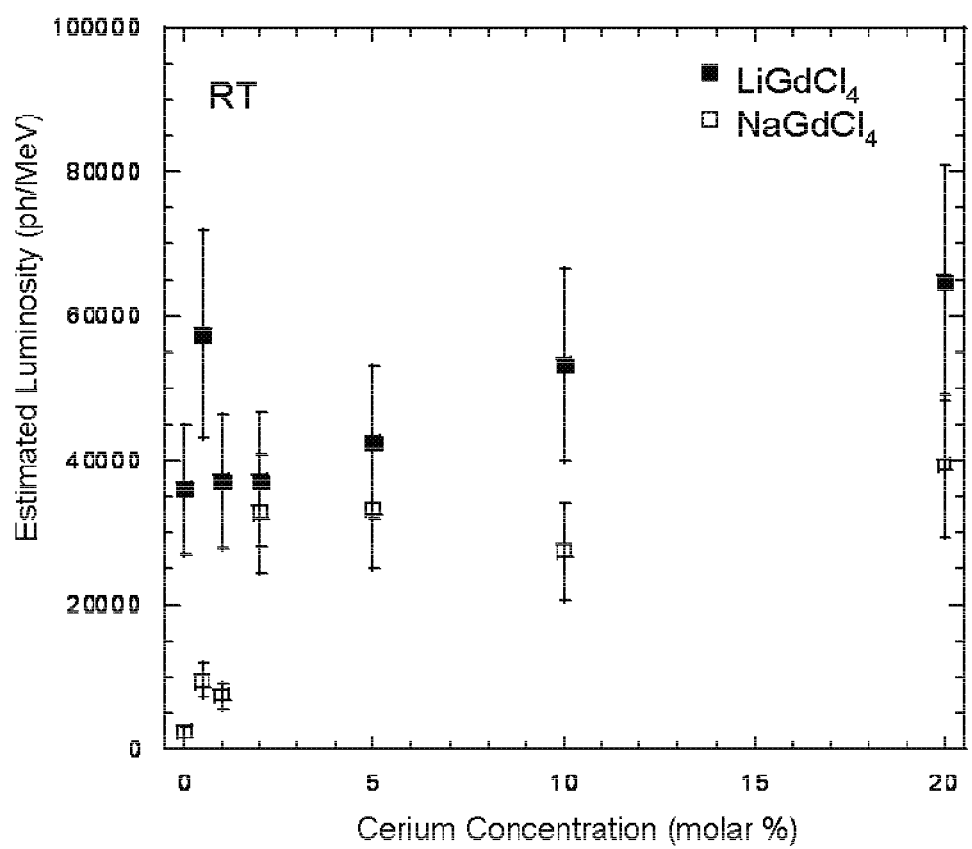
FIG. 5 shows estimated luminosity of $LiGdCl_4$ and $NaGdCl_4$ at room temperature as a function of cerium concentration.

Estimated Luminosities and Decays. Estimated luminosities of $LiGdCl_4$:Ce and $NaGdCl_4$:Ce were obtained from pulsed x-ray (PXRL) measurements by normalizing their measured values to that of polycrystalline YAP:Ce. The total light yields increase in both compounds as the $Ce^{3+}$ concentrations increase from 0 to 20% (FIG. 5).

Figure 6:
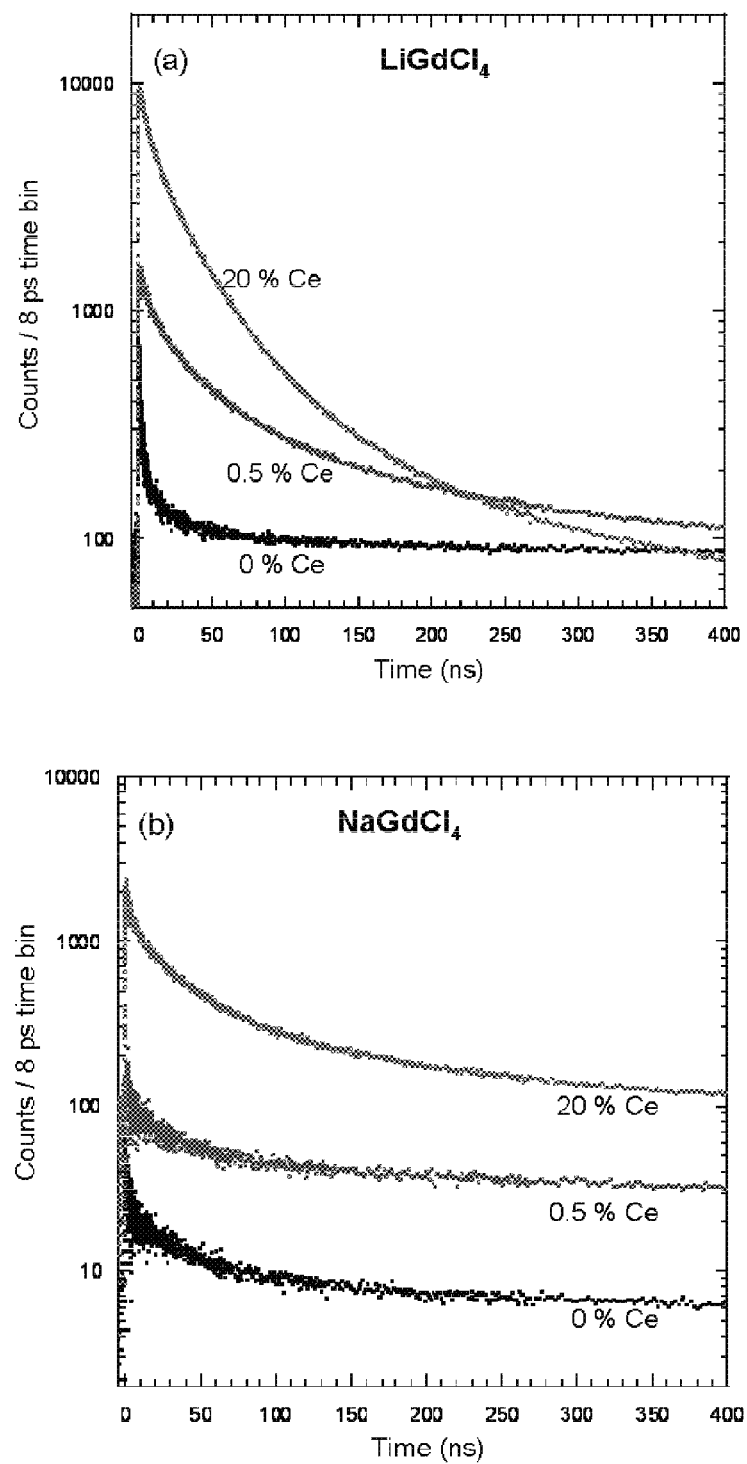
FIG. 6 shows the room temperature pulsed X-ray decay curves of (a) $LiGdCl_4$:Ce and (b) $NaGdCl_4$:Ce, with [Ce]=0, 0.5 and 20%.

Decay curves were also obtained from PXRL measurements of the undoped and cerium-doped variations of $LiGdCl_4$ and $NaGdCl_4$. The curves were fitted to determine the decay components of the light yield (FIG. 6).

Figure 7:
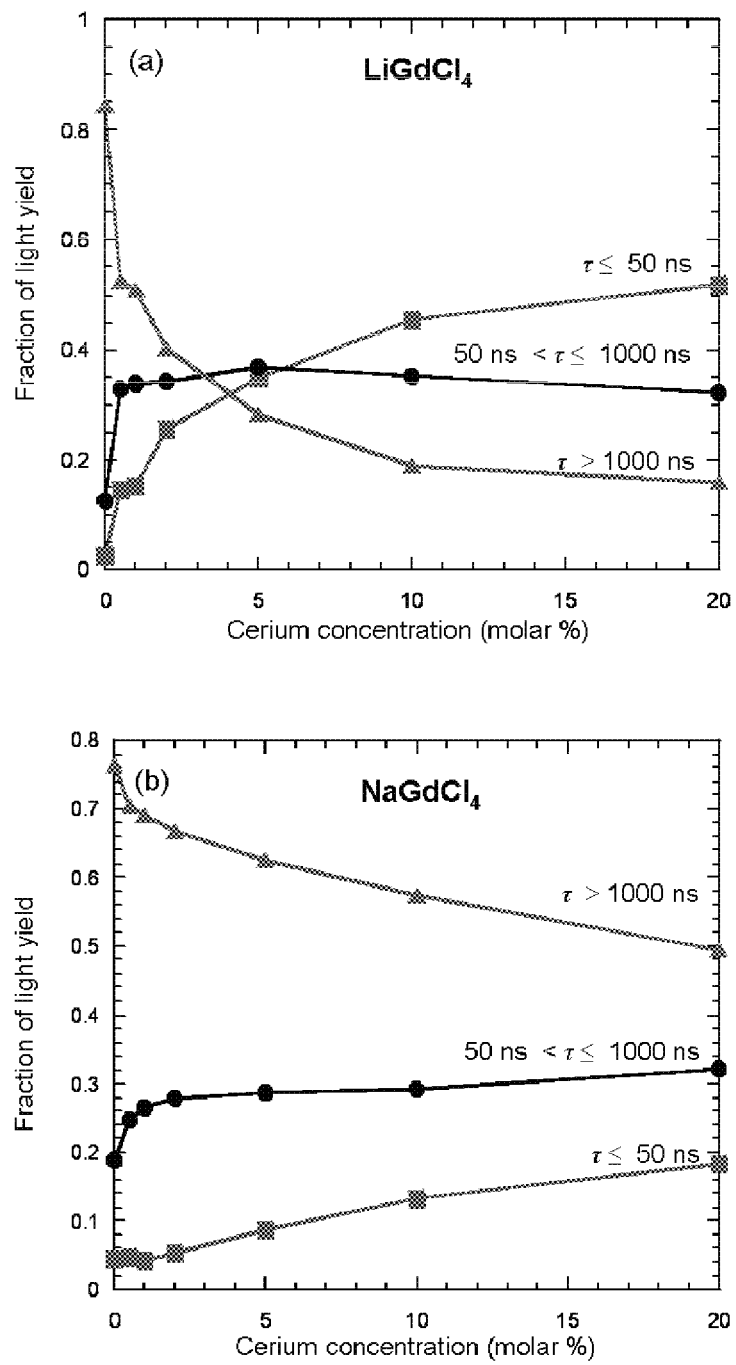
FIG. 7 shows the room temperature decay component trends of the (a) LiGdCl$_4$:Ce and (b) NaGdCl$_4$:Ce scintillation light as a function of cerium concentration.

The decay curves of each sample of these two compounds are multiexponential. We divide the decay curve into three time bands: $\tau \leq 50$ ns, $\tau$ in the range of 50-1000 ns, and $\tau > 1000$ ns. FIG. 7 indicates that as the cerium concentration increases the fraction of light decaying within 50 ns, while the 50-1000 ns component stays relatively constant for 2%<[Ce]<20%, for both compounds.

Figure 8:
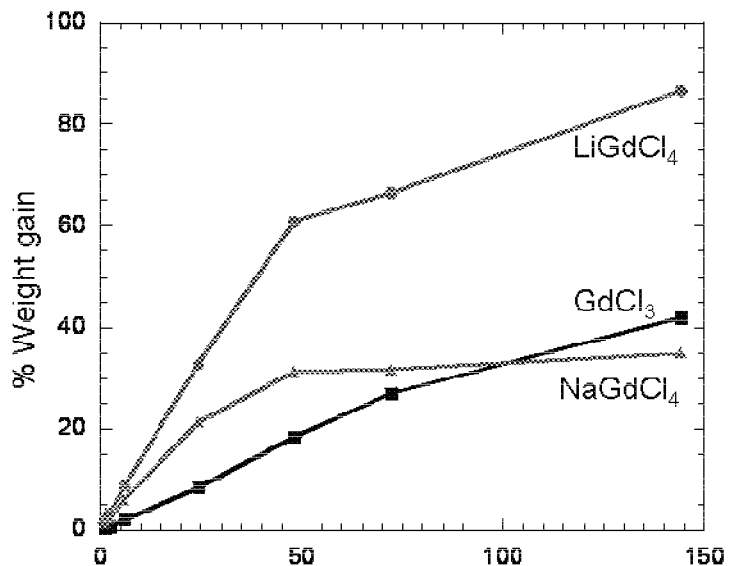
FIG. 8 shows the gygroscopic nature of GdCl$_3$, LiGdCl$_4$, and NaGdCl$_4$ upon exposure to air over time measured by weight gains.

Hygroscopic Nature. The hygroscopicity of powder samples of undoped $GdCl_3$, $LiGdCl_4$, and $NaGdCl_4$ were analyzed (FIG. 8). The presence of lithium cations caused the $LiGdCl_4$ to absorb more moisture from the air than $GdCl_3$ and $NaGdCl_4$. Powder X-ray diffraction analysis of the resultant products after 140 hrs of exposure to air indicated the presence of $GdCl_3.6H_2O$ in all three materials. $NaGdCl_4$ is the least hygroscopic of the three.

Discussion

From the experimental results discussed in the previous section, two observations can be made of the scintillation properties of $LiGdCl_4$:Ce and $NaGdCl_4$:Ce:

The scintillation emission spectra are cerium-like and the luminosities increase gradually as the cerium concentration increases in $LiGdCl_4$ and increases sharply as cerium concentration is increased to 2% doping then levels off for $NaGdCl_4$ (FIG. 5). The highest light output was found at 20% doping for both compounds. At this concentration, the luminosity is approximately 3.6 and 2.2 times that of YAP:Ce for $LiGdCl_4$:Ce and $NaGdCl_4$:Ce, respectively.

The scintillation time responses for these materials display several decay components (FIG. 6). The contribution to these components are cerium concentration dependent (FIG. 7 and Table 3). For the $LiGdCl_4$:Ce the percentage of fast component ($\leq 50$ ns) increases from 2 to 52 % with the cerium concentrations increasing from 0 to 20%. For $NaGdCl_4$:Ce, the fast components increase from 4 to 18%, whereas the slower components increase for cerium concentrations less than 2% and then remain relatively constant at concentrations greater than 2%.

ring from path B feeds into the cerium excitation and results in slower cerium emission. This mechanism is concentration dependent. A similar scintillation model has been used to explain the slow decay components and cerium concentration dependence of $Gd_2SiO_5$:Ce. In this material, these scintillation properties are attributed to non-radiative transfers from $Gd^{3+}$ to $Ce^{3+}$.

Although path D is possible, the only evidence of excitonic emission at room temperature is the broad shoulder at 425 nm in the X-ray excited emission spectrum of $NaGdCl_4$:20% Ce (FIG. 4 (b)). Therefore, path D is displayed as only a small component of the emission in our diagram.

In all cases, the theoretically allowable scintillation light yield is not fully realized because of nonradiative loss processes (indicated by path C).

CONCLUSION

Two new inorganic alkali gadolinium halide based scintillators were found. $LiGdCl_4$:20 % $Ce^{3+}$ exhibits scintillation light yield that is 3.6 times that of YAP:Ce polycrystalline powder, with a cerium-like component decay time of 33 ns. $NaGdCl_4$:20% $Ce^{3+}$ exhibits scintillation light yield of 2.2 times that of YAP:Ce, with a cerium-like component decay time of 26 ns. Slower decay components are present in the cerium emissions, which are tentatively attributed to a

TABLE 3

Physical and luminescence properties of $LiGdCl_4$ and $NaGdCl_4$ scintilaltors.

| Candidate | Density (g/cm$^3$) | $Ce^{3+}$ conc. (%) | Emission wavelength (nm) | Relative luminosity (×YAP: Ce) | Estimated luminosity (ph/MeV)** | Decay fractions $\tau \leq 50$ ns | Decay fractions $50$ ns $< \tau \leq 1000$ ns | Decay fractions $\tau > 1000$ ns |
|---|---|---|---|---|---|---|---|---|
| $LiGdCl_4$ | 3.70 | 0* | 310($Gd^{3+}$), 340, 360 | 2.0 | 36,000 | 0.02 | 0.13 | 0.85 |
| | | 0.5 | 340, 365 | 3.2 | 57,500 | 0.15 | 0.33 | 0.52 |
| | | 1 | 340, 365 | 2.1 | 37,100 | 0.15 | 0.34 | 0.51 |
| | | 2 | 345, 365 | 2.1 | 37,300 | 0.26 | 0.34 | 0.40 |
| | | 5 | 345, 365 | 2.4 | 42,500 | 0.35 | 0.37 | 0.28 |
| | | 10 | 345, 365 | 2.9 | 53,300 | 0.46 | 0.35 | 0.19 |
| | | 20 | 345, 365 | 3.6 | 64,600 | 0.52 | 0.32 | 0.16 |
| $NaGdCl_4$ | 3.44 | 0* | 305($Gd^{3+}$), 345, 365 | 0.1 | 2,400 | 0.05 | 0.19 | 0.76 |
| | | 0.5 | 350, 370 | 0.5 | 9,600 | 0.05 | 0.25 | 0.70 |
| | | 1 | 350, 370 | 0.4 | 7,400 | 0.04 | 0.27 | 0.33 |
| | | 2 | 350, 370 | 1.8 | 32,700 | 0.05 | 0.28 | 0.67 |
| | | 5 | 350, 370 | 1.9 | 33,400 | 0.09 | 0.29 | 0.62 |
| | | 10 | 350, 370 | 1.5 | 27,400 | 0.13 | 0.29 | 0.58 |
| | | 20 | 350, 370 | 2.2 | 39,400 | 0.18 | 0.32 | 0.50 |

*Possible cerium impurity from starting reagents.
**Based on YAP: Ce luminosity of 18,000 ph/MeV; Luminosities have a possible error of 25% owing to counting statistics.

Figure 9:
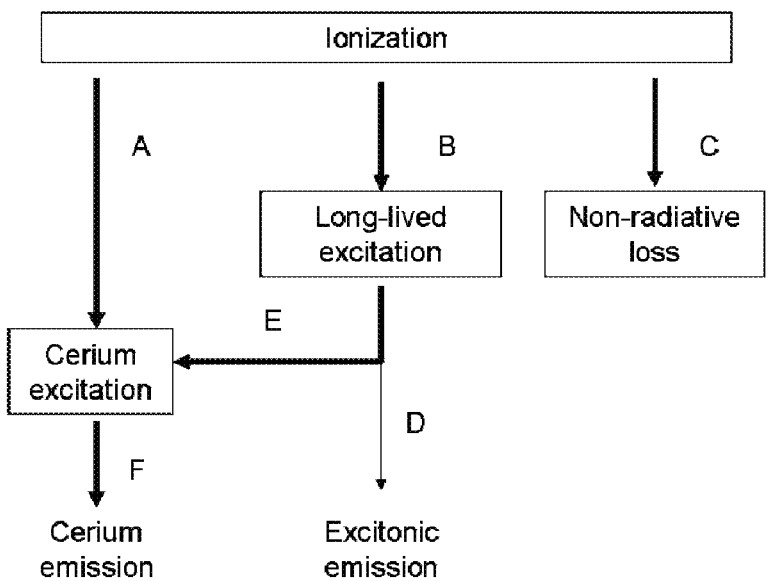
FIG. 9 shows a diagram detailing proposed scintillation mechanisms to account for the luminescence properties exhibited by cerium-doped LiGdCl$_4$ and NaGdCl$_4$. The slow cerium emission originates from path E, where slow emission feeds into cerium excitation

These results cannot be explained by a simple scintillation mechanism involving only the sequential capture of electron/hole pairs at a cerium ion. Based on the evidence of gadolinium emission in our materials, we propose that mechanisms represented schematically in FIG. 9 could be occurring in our cerium doped materials.

Path A represents the direct ionization of cerium by X-rays or sequential capture of electron/hole pairs at a cerium ion that leads to prompt cerium excitation and emission. This is what is observed in the fast components of the scintillation decays. Path B illustrates the ionization of long-lived luminescent centers, such as $Gd^{3+}$ or self-trapped excitons. From path B, either path D or E can occur in principle. To account for the slow $Ce^{3+}$ emission seen in our cerium doped materials, we propose path E, where the long-lived emission occurdelayed energy transfer mechanism such as $Gd^{3+}$ to $Ce^{3+}$ or STE to $Ce^{3+}$. In addition to their potential use as gamma-ray detectors these materials could have applications in neutron detection devices due to the presence of lithium and/or gadolinium in their lattice.

While the present invention has been described with reference to the specific embodiments thereof, it should be understood by those skilled in the art that various changes may be made and equivalents may be substituted without departing from the true spirit and scope of the invention. In addition, many modifications may be made to adapt a particular situation, material, composition of matter, process, process step or steps, to the objective, spirit and scope of the present invention. All such modifications are intended to be within the scope of the claims appended hereto.

What is claimed is:

1. An inorganic scintillator comprising a gadolinium halide cerium-doped, having the formula $BaGdCl_5$:Ce; wherein the molar percent of cerium is 0.50% to 10.0%; and the inorganic scintillator has a size of at least 1 mm and when the inorganic scintillator is excited by X-ray radiation has an emission intensity of at least 21,600 ph/MeV.

2. An inorganic scintillator comprising a gadolinium halide having the formula $LiGdCl_4$:Ce; wherein the molar percent of cerium is more than 0% to 100%, and when the inorganic scintillator is excited by X-ray radiation has an emission intensity of at least 36,000 ph/MeV.

3. A method for producing the composition comprising an inorganic scintillator of claim 1 comprising:
   a. providing a mixture of halide salts useful for producing the inorganic scintillator,
   b. heating the mixture such that the halide salts or solids start to react, and
   c. cooling the mixture of the formed composition to room temperature such that the composition is formed.

4. The method of claim 3, wherein the mixture of halide salts consisting essentially of solid barium chloride, and solid gadolinium halide, and solid cerium halide, wherein (i) the mixture has a stoichiometry of about 1 barium atoms: about 1 gadolinium atom: about 5 halogen atoms, (ii) the halogen is Cl and (iii) the molar percent of cerium is from more than 0% to 100%.

5. A device comprising a composition comprising the inorganic scintillator of claim 1 wherein the inorganic scintillator is capable of detecting ionizing radiation.

6. A device comprising a composition comprising the inorganic scintillator of claim 2 wherein the inorganic scintillator is capable of detecting ionizing radiation.

7. The inorganic scintillator of claim 1, wherein the molar percent of cerium is from 1% to 10%.

8. The inorganic scintillator of claim 2, wherein the molar percent of cerium is from more than 0% to 50%.

9. The inorganic scintillator of claim 2, wherein the inorganic scintillator has a size of at least 1 mm.

* * * * *